United States Patent
Birch et al.

(10) Patent No.: US 6,361,020 B1
(45) Date of Patent: Mar. 26, 2002

(54) VALVE FOR USE WITH HIGH PURITY GAS

(75) Inventors: David William Birch, Whitehill (GB); Peter Harold Buckley, Carlsbad, CA (US); Kenneth William Cross, Cardiff, CA (US); Richard A. Hogle, Oceanside, CA (US); Kazuya Inoue, Shanghai (CN); Jack B. Wert, Titusville, NJ (US)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 09/481,583

(22) Filed: Jan. 12, 2000

(30) Foreign Application Priority Data

May 6, 1999 (GB) .............................................. 9910493

(51) Int. Cl.[7] ................................................. F16K 1/00
(52) U.S. Cl. ....................................... 251/319; 251/331
(58) Field of Search ............................. 251/331, 335.2, 251/318, 319

(56) References Cited

U.S. PATENT DOCUMENTS

| | | | | |
|---|---|---|---|---|
| 2,302,029 A | * | 11/1942 | Hulsmann | ................... 251/318 |
| 3,844,307 A | * | 10/1974 | Soury et al. | ........... 251/61.4 X |
| 4,010,769 A | * | 3/1977 | De Lorenzo et al. | . 251/335.2 X |
| 5,762,086 A | * | 6/1998 | Ollivier | .................. 251/331 X |
| 5,924,447 A | * | 7/1999 | Evans et al. | ................. 137/557 |

* cited by examiner

Primary Examiner—Kevin Lee
(74) Attorney, Agent, or Firm—Philip H. Von Neida; Salvatore P. Pace

(57) ABSTRACT

A valve for use with an ultra high purity gas comprising a valve body defining a valve chamber having a valve outlet through which gas is discharged and containing a reciprocable sealing member, characterized in that the valve chamber is in fluid communication with a source of the gas and in that the sealing member is reciprocable along an axis substantially parallel to the direction of flow of gas discharged from the valve outlet and into and out of sealing contact with a sealing face located within the valve chamber and circumscribing the inlet end of a valve outlet pipe, the opposite, outlet end of which pipe forms the valve outlet. The valve has a low wetted area and is thus easy to purge, and the valve design both reduces wear and restricts it to a single component which is easily replaced when necessary.

2 Claims, 1 Drawing Sheet

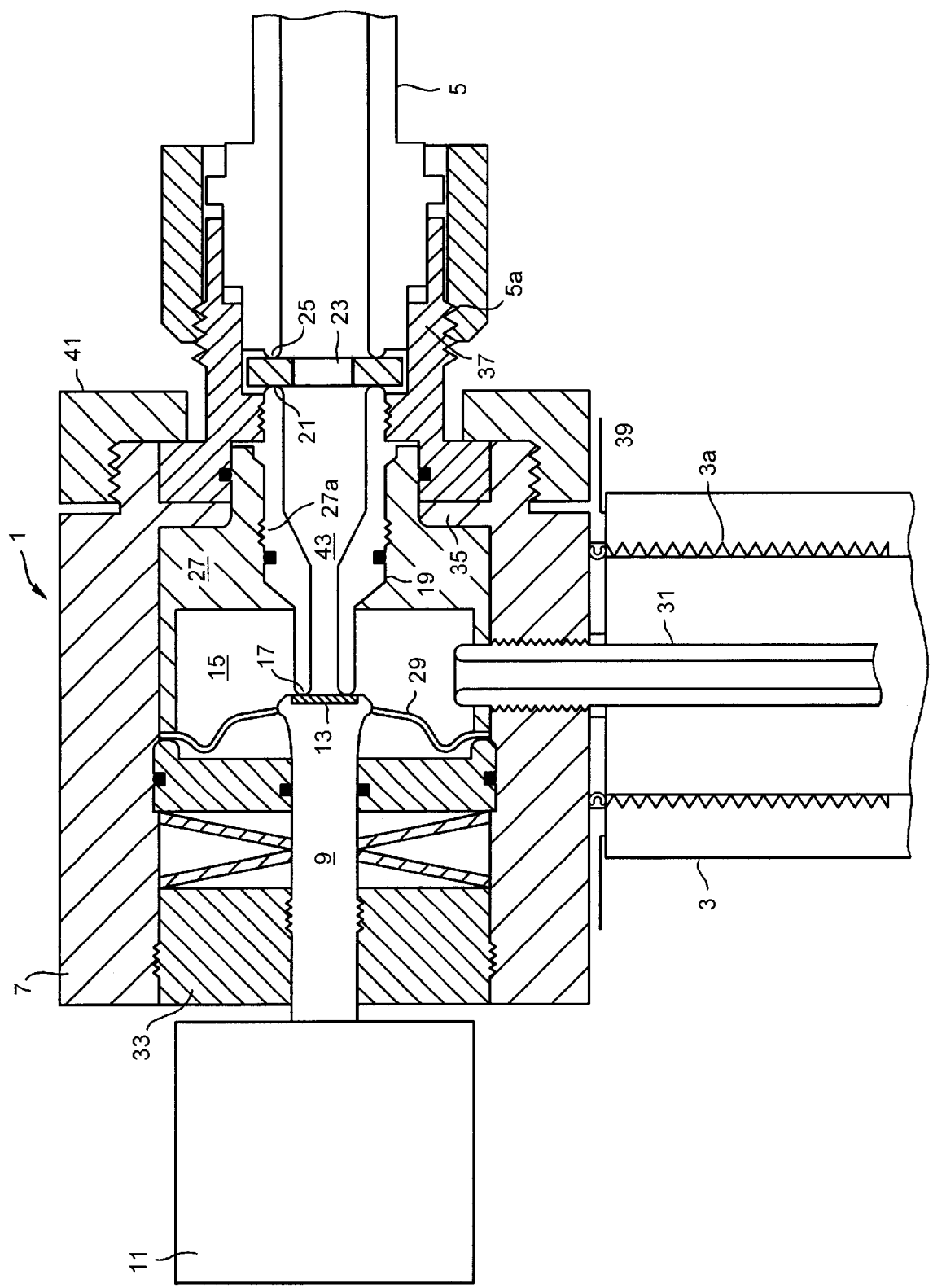

VALVE FOR USE WITH HIGH PURITY GAS

BACKGROUND OF THE INVENTION

This invention relates to valve apparatus for actuating a flow of an ultra high purity gas from a source thereof (as used herein, the term "ultra high purity" means a gas having a total impurity of 50 parts per million or less, and the term "gas" is intended to embrace gas mixtures as well as nuclear gases).

Ultra high purity gases are usually provided in storage cylinders, for use in various processes in which purity is an essential requirement, in the electronics manufacturing industry, for example. Actuation of a flow of gas from the cylinder to the manufacturing apparatus in which the gas is to be used is effected by a valve, having an inlet connected to the cylinder and an outlet connected to a gas conduit leading to the manufacturing apparatus. The principal function of such a valve is effectively to allow or to prevent the flow of gas, rather than adjustably to control the flow.

Such valves have several rigorous requirements. Firstly, the valves must be leak tight; they must prevent the ingress of ambient air, or any other surrounding atmosphere, which would contaminate the ultra high purity gas. Equally undesirable is any leakage of the ultra high purity gas to atmosphere, since many such gases are toxic and/or pyrophoric. Leakage from such valves is particularly problematic due to wear; actuation of the flow depends at some stage on the contact between sealing faces, which are prone to wear, and hence leak, over time.

The valves must be made of a "clean" material, that is to say that the material in contact with the gas must not release molecules or particles which would act as contaminants. Similarly, the valve must be configured so as to prevent gas flows from entraining molecules or particles of the valve material, through abrasive or erosive action, for example. To help prevent contamination, the flows of gas through the valve should be considered, particularly upon opening the valve; when the valve is first opened, there is a tendency for gas to accelerate towards the valve outlet, and if the flow path of the gas is complicated or tortuous, an accelerating "plug" of gas can impact on inner surfaces of the valve, hastening wear and detaching particles of the valve material which contaminate the gas. The valves must also be configured so as to minimise such contamination, and also in order that the purge process is easily and effectively achievable; many manufacturing processes require the use of a sequence of several ultra high purity gases, and it is therefore necessary at separate stages of the process to remove one ultra high purity gas supply and replace it with another, without any contamination of the second gas and without any release of the gas to atmosphere, hence an effective purge is absolutely required.

A corollary of the requirements that the valve not contaminate the gas flowing therethrough and that the valve be easy to purge effectively is that the valve should have a low "wetted area", that is, the surface area of that part of the valve which comes into intermittent contact with the gas or the flow is actuated should be minimised. A low wetted area is important as it reduces the available surface area of valve from which particles might be carried to contaminate the gas flow, and it reduces the available surface area of valve to which gas molecules might temporarily bond, thereby making the purging process more difficult.

SUMMARY OF THE INVENTION

Accordingly, the present invention provides a valve for use with an ultra high purity gas comprising a valve body defining a valve chamber, having a valve outlet through which gas is discharged and containing a reciprocable sealing member, characterised in that the valve chamber is in fluid communication with a source of the gas and in that the sealing member is reciprocable along an axis substantially parallel to the direction of flow of gas discharged from the valve outlet and into and out of sealing contact with a sealing face located within the valve chamber and circumscribing the inlet end of a valve outlet pipe, the opposite, outlet end of which pipe forms the valve outlet.

With such an arrangement the wetted area is only that defined by the valve outlet pipe, between its inlet and outlet ends, which can be minimised. The valve chamber may be in constant contact with the gas, however this is acceptable because this volume does not need to be purged. Because the sealing face contacts a peripheral seal, which is surrounded by the gas in the valve chamber, the flow of gas on opening the valve accelerates into the valve outlet pipe, and provided that this is designed with no unnecessary constrictions or bends the initial "plug" of gas will not impact on the valve material, thus avoiding the detaching of particles which could contaminate the gas. Precisely because the valve outlet pipe is configured to permit free flow of gas therethrough, also means that the valve outlet pipe and the area of the reciprocable sealing member circumscribed by the valve outlet pipe sealing face (the "wetted" areas) are easily purged. The surface of the valve outlet pipe exposed to gas flowing therethrough can easily be formed with (or of) a suitable material to minimise reaction with and/or contamination of the gas, and the entire arrangement can be constructed so to be at least as leak tight as conventional valves.

Very preferably, the outlet end of the valve outlet pipe is circumscribed by a sealing face for sealing against means for conducting gas discharged from the valve for subsequent use.

In this way, a gas conduit leading to an apparatus in which the gas is to be used can be sealingly attached to the valve with ease. The valve outlet pipe is advantageously an integral member which is separable from the valve, to permit easy replacement. Thus, by exchanging a single part of the valve, all those valve parts subject to wear (namely the sealing faces at the inlet and outlet ends of the valve outlet pipe) can be swiftly and easily replaced.

The valve outlet pipe, or at least the internal part thereof through which gas flows, is preferably generally cylindrical, so that the inlet and outlet sealing faces thereof are easily manufactured. Also, screw thread fittings for fixing the valve outlet pipe into the valve are easily manufactured or fitted on a cylindrical body. The outlet pipe is made of a material and has a surface finish such that any reaction between it and the gas is minimised.

The valve chamber may be substantially annularly disposed about the inlet end of the valve outlet pipe so that, as the valve is opened and the sealing member moved away from the sealing face at the inlet end of the valve outlet pipe, gas has a relatively free flowpath into the valve outlet pipe thereby promoting uniform gas flow thereinto and therethrough and so minimising possibly harmful impact and/or abrasion by the gas flow on the inner surface of the valve outlet pipe.

The sealing member is preferably attached to a resilient diaphragm, which is configured and adapted to seal off the valve chamber opposite the valve outlet. As is known in the art, an actuator is provided behind the diaphragm to reciprocate the sealing member, so as to open or close the valve, whilst flexing the diaphragm but maintaining the valve chamber sealed relative to the ambient atmosphere.

The valve chamber may be at least partially defined by a lining member releasably contained within the valve body and the reciprocable sealing member. This lining member may be easily exchanged as may be necessitated for reasons of wear, or to prevent adverse reaction and to optimise performance should the valve be used with a different kind of gas.

In order to minimise contamination arising from the cylinder in which the gas is supplied, a dip tube may extend from the valve chamber into the cylinder interior, the dip tube being adapted to allow gas to flow freely, via a bell-mouth for example, from the cylinder, from a point distant from the internal cylinder walls. Dip tubes are known in the art.

BRIEF DESCRIPTION OF THE DRAWINGS

The invention will now be described by way of example and with reference to the accompanying schematic view of a valve for use with an ultra high purity gas in accordance with the invention.

DETAILED DESCRIPTION OF THE INVENTION

The valve 1 is shown connected to a gas cylinder 3 and to a conduit 5 leading to an apparatus (not shown) requiring a supply of the ultra high purity gas in the cylinder 3. These connections are made by standard screw threads 3a, 5a, as is known in the art. The valve 1 comprises a body 7 containing a sealing member 9 which is reciprocable (along a horizontal axis, as illustrated) by means of an acutator 11 such that a sealing face 13 (which is made of a soft sealing material, as is known in the art) at an end of the sealing member 9 moves within a valve chamber 15 into and out of contact with an annular sealing face 17 formed at the inlet end of a valve inlet pipe 19. At its other, outlet end the valve inlet pipe 19 has another annular sealing face 21 for sealing against a sealing washer 23 of soft material, which in turn seals against annular sealing face 25 of the conduit 5, again as is known in the art.

The valve outlet pipe is sealed within lining member 27 by means of a screw thread 27a, and lining member 27 is slid into and releasably held within the valve body 7 by resilient diaphragm 29, to which sealing member 9 is attached. A dip tube 31 provides a conduit for gas to flow from the cylinder 3 into the valve chamber 15.

The diaphragm 29 is sealingly held (for example, by welding) against the lining member 27 and the internal walls of the valve body 7 by means of the actuator sealing arrangement 33, which also serves to hold the lining member 27 locked in place against a protruding shoulder portion 35 of the valve body 7.

The conduit 5 is releasably attached by screw thread 5a to attachment member 37. The attachment member 37 is shaped to fit within recess 39 of valve body 7, the arrangement being such that attachment member 37 can slide into recess 39 right to left along a horizontal axis in the drawing but so that attachment member 37 cannot rotate about that axis relative to the valve body 7. This may conveniently be achieved by giving that part of attachment member 37 which fits into recess 39 a hexagonal, "nut-shaped" profile, recess 39 being correspondingly shaped. Attachment member 37 is releasably but sealingly held in position relative to valve body 7 by screw cap 41. This attachment member 37, screw cap 41 arrangement is highly advantageous, as it prevents torque, applied when tightening screw threads 5a to attach conduit 5 to valve 1, being transferred to any other part of the valve (in particular, valve outlet pipe 19 and its sealing faces 17, 21) helping prevent the damage so frequently occasioned by ham-fisted tightening of a user's conduits to valves.

The valve 1 is illustrated in the closed position, with the sealing face 13 pressed firmly against the sealing face 17 of the valve outlet pipe 19. Ultra high purity gas is therefore sealed within the cylinder 3 and, via dip tube 31, the valve chamber 15 defined by the lining member 27, the diaphragm 29 and the inlet end of the valve outlet tube 19, but no gas can flow into the conduit 43 leading through the valve outlet pipe 19 and out of the valve 1 into the conduit 5.

On opening the valve, sealing member 9 is drawn (from right to left as illustrated) away from the valve outlet pipe 19 by actuator 11, breaking the sealing contact between the respective sealing faces 13, 17. Gas flows from all around the sealing face 17 into the conduit 43 for discharge out of the valve 1, the arrangement allowing uniform gas flow across the cross-section of conduit 43, so minimising gas "plug" impact and possible contaminative wear of the walls of the conduit 43.

Upon closing valve 1, sealing member 9 and diaphragm 29 again adopt the positions illustrated, and sealing faces 13, 17 come into sealing contact, so that again gas is restricted to valve chamber 15. The valve 1 can then be easily purged (in order to detach it from conduit 5 for example), since the only area "wetted" by the gas requiring purging is the conduit 43, the internal surfaces of valve outlet pipe 19, which is easily purged by virtue of its relatively small size and its "straight-through", generally cylindrical shape.

The parts of the valve most likely to experience wear are sealing faces 13 and 21 at either end of the valve outlet pipe 19. To an extent any such wear is ameliorated by virtue of sealing faces 13 and 21 being both disposed at opposite ends of an integral valve outlet pipe 19, and also by the soft materials of which sealing face 13 and sealing washer 23 are formed. Valve outlet pipe 19 is easily removed for exchange, when its sealing face(s) is/are unperceptably worn, for example, merely by unscrewing cap 41 and sliding off attachment member 37 so that the valve outlet pipe 19 may be unsecured (clearly, this should only be done when cylinder 3 is substantially emptied of gas).

Lining member 27 and/or valve outlet pipe 19 may easily be exchanged (for example, when cylinder 3 is empty and the valve 1 is to be used with another gas (mixture) which is incompatible with the material of which lining member 27 and valve outlet pipe 19 are formed) simply by removing dip tube 31 and then actuator sealing assembly 33, together with sealing member 9 and diaphragm 29, and sliding member 27 and pipe 19 out of valve body 7.

What is claimed is:

1. A valve for use with an ultra high purity gas comprising a valve body defining a valve chamber having a valve outlet through which gas is discharged; containing a reciprocal sealing member, and a lining member releasably contained within said valve body and said reciprocable sealing member, characterised in that the valve chamber is in fluid communication with a source of the gas and in that the sealing member is reciprocable along an axis substantially parallel to the direction of flow of gas discharged from the valve outlet and into and out of sealing contact with a sealing face located within the valve chamber and circumscribing the inlet end of a valve outlet pipe, the opposite, outlet end of which pipe forms the valve outlet.

2. A valve according to claim 1, when attached to a cylinder containing the gas and comprising a dip tube extending from the valve chamber to the cylinder interior and adapted to allow gas to flow freely from the cylinder from a point distant from the walls of said cylinder, through the dip tube and thence into the valve chamber.

* * * * *